United States Patent
Thyagarajan

(10) Patent No.: US 11,330,106 B1
(45) Date of Patent: May 10, 2022

(54) SYSTEMS AND METHODS FOR OCCUPATION CATEGORIZATION

(71) Applicant: United Services Automobile Association (USAA), San Antonio, TX (US)

(72) Inventor: Thirumurugan Thyagarajan, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/036,935

(22) Filed: Sep. 29, 2020

Related U.S. Application Data

(60) Provisional application No. 62/908,210, filed on Sep. 30, 2019.

(51) Int. Cl.
| | |
|---|---|
| *H04M 3/51* | (2006.01) |
| *G06F 40/30* | (2020.01) |
| *G06Q 30/00* | (2012.01) |
| *G06N 20/00* | (2019.01) |
| *G06F 3/0482* | (2013.01) |

(52) U.S. Cl.
CPC ........ *H04M 3/5183* (2013.01); *G06F 3/0482* (2013.01); *G06F 40/30* (2020.01); *G06N 20/00* (2019.01); *G06Q 30/0185* (2013.01); *H04M 2203/408* (2013.01)

(58) Field of Classification Search
CPC combination set(s) only.
See application file for complete search history.

(56) References Cited

U.S. PATENT DOCUMENTS

| | | | |
|---|---|---|---|
| 10,643,183 B2 * | 5/2020 | Tian | G06Q 10/105 |
| 2014/0172732 A1 * | 6/2014 | Baladi | G06Q 10/1053 |
| | | | 705/321 |
| 2016/0132830 A1 * | 5/2016 | Zhang | G06Q 10/105 |
| | | | 705/320 |
| 2021/0097063 A1 * | 4/2021 | Wan | G06N 3/0445 |

* cited by examiner

*Primary Examiner* — Phung-Hoang J Nguyen
(74) *Attorney, Agent, or Firm* — Fletcher Yoder, PC

(57) ABSTRACT

System and methods for classifying free-form occupation inputs into prescribed occupation inputs are provided. In one embodiment, a machine receives an occupation; generates a meaning vector; compares the meaning vector against meaning vectors associated with a prescribed set of occupations; determines meaning scores for the prescribed set of occupations based upon an affinity between vector and the vectors associated with the prescribed set of occupations; selects a subset of the prescribed set of occupations based upon the meaning scores for the prescribed set of occupations; presents a selectable list of the subset of prescribed occupations; receives an indication of a selection a particular prescribed occupation for the selectable list; and provides the particular prescribed occupation to a downstream-processing system that is configured to only handle occupations in prescribed set of occupations.

17 Claims, 7 Drawing Sheets

FIG. 5

| | OCCUPATION | 606 | 510 | 608 | 610 | 612 | 614 |
|---|---|---|---|---|---|---|---|
| | | CUSTOMEROCCUPATIONNM | DEVELOPMENT PRODUCT OWNER | CUSTOMEROCCUPATIONDESCRIPTION | SPELLING | MEANING | COMPOSITE |
| 336 | | PRODUCT MANAGER | | — | 200 | 338.280489 | 538.280489 |
| 666 | | TM DEVELOP MGR | | TRAINING AND DEVELOPMENT MANAGER | 200 | 303.165085 | 503.165085 |
| 563 | | MODEL PROD PROMOTER | | MODEL DEMONSTRATOR OR PRODUCT PROMOTER | 200 | 268.265491 | 468.265491 |
| 667 | | TMG DEVELOP SPCI | | TRAINING AND DEVELOPMENT SPECIALIST | 200 | 255.610972 | 455.610972 |
| 553 | | PRODUCTION WKR | | PRODUCTION WORKER | 82 | 276.281313 | 358.821313 |
| 165 | | MANUFACTURING REP | | SALES REPRESENTATIVE WHOLESALE & MANUFACTURIN... | 93 | 256.520240 | 349.520240 |
| 489 | | GRADE SORT AGRI PROD | | GRADER OR SORTER AGRICULTURAL PRODUCTS | 93 | 242.725443 | 335.725443 |
| 211 | | PRODUCER | | PRODUCER OR DIRECTOR | 80 | 239.362135 | 319.362135 |
| 651 | | SUPV PROD OPR WKR | | SUPERVISOR OF PRODUCTION WORKERS | 82 | 233.012367 | 315.012367 |
| 166 | | MARKETING MANAGER | | MARKETING MANAGER | 0 | 311.730589 | 311.730589 |
| 338 | | PROJECT MANAGER | | PROJECT MANAGER | 0 | 304.217587 | 304.217587 |
| 339 | | PROPERTY MANAGER | | PROPERTY REAL STATE COMMUNITY ASSOCIATION M... | 0 | 292.293169 | 292.293169 |
| 334 | | PLANT MANAGER | | PLANT AND SYSTEM OPERATOR | 0 | 291.350676 | 291.350676 |

*FIG. 6*

SYSTEMS AND METHODS FOR OCCUPATION CATEGORIZATION

This application claims the benefit of U.S. Provisional Patent Application No. 62/908,210, entitled "SYSTEMS AND METHODS FOR OCCUPATION CATEGORIZATION," filed Sep. 30, 2019, which is incorporated herein by reference in its entirety for all purposes.

BACKGROUND

The present disclosure relates generally to techniques characterizing occupations. More specifically, the present disclosure relates to categorizing free-form occupation inputs into pre-defined occupation buckets.

In an ever-increasingly sophisticated world, many new occupations have been created. Further, with a multitude of companies employing workers with unique job titles, the number of job titles has exponentially grown.

Classifying occupations may be crucial for digital processing. For example, anti-money laundering (AML) regulations may require occupational classifications to perform computer analysis on transactions to identify money laundering risks. Unfortunately, this expanse in jobs and job descriptions has made it increasingly hard to classify occupations to perform such computer processing.

DRAWINGS

These and other features, aspects, and advantages of the present disclosure will become better understood when the following detailed description is read with reference to the accompanying drawings in which like characters represent like parts throughout the drawings, wherein.

Figure 4:
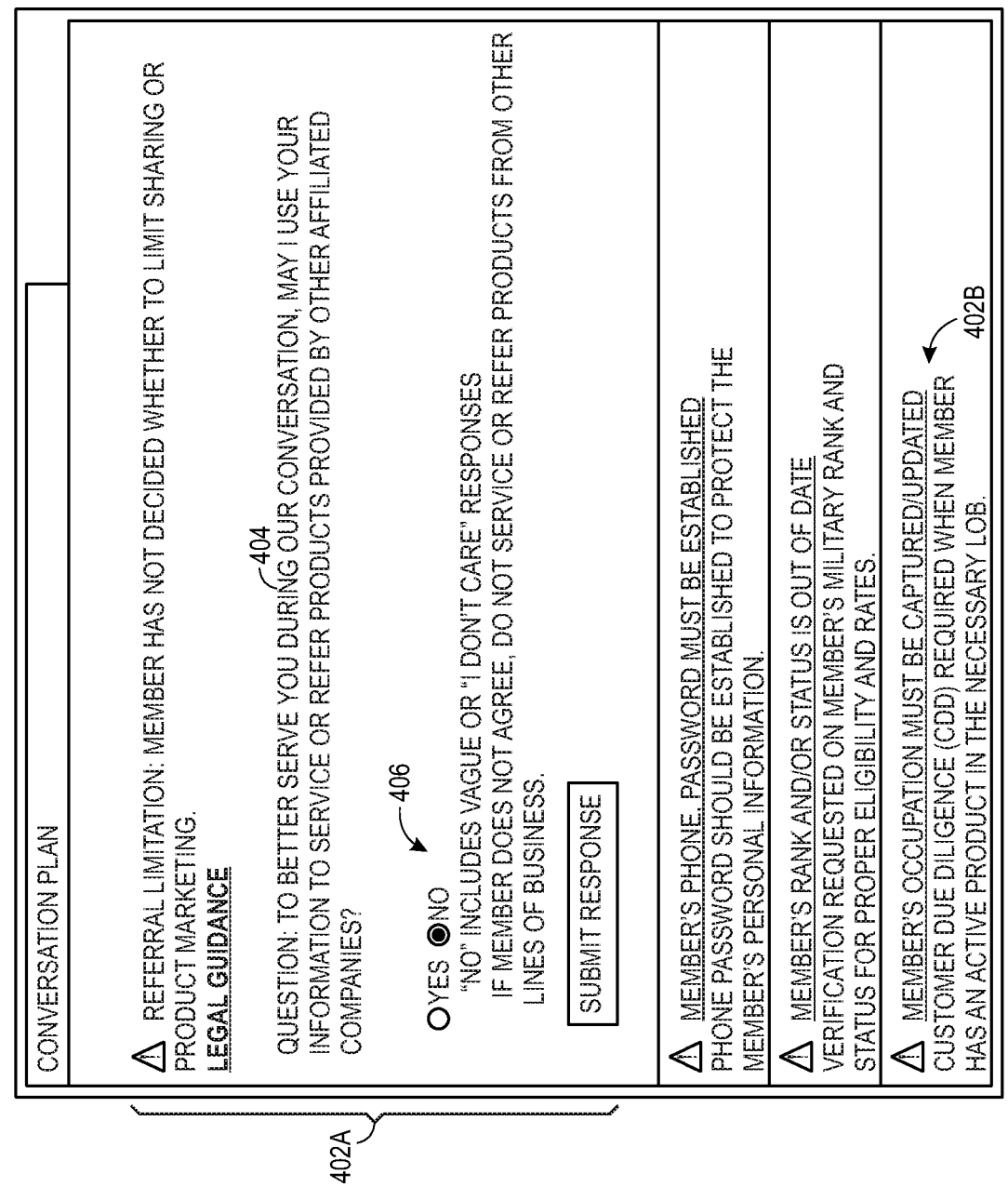
Figure 5:
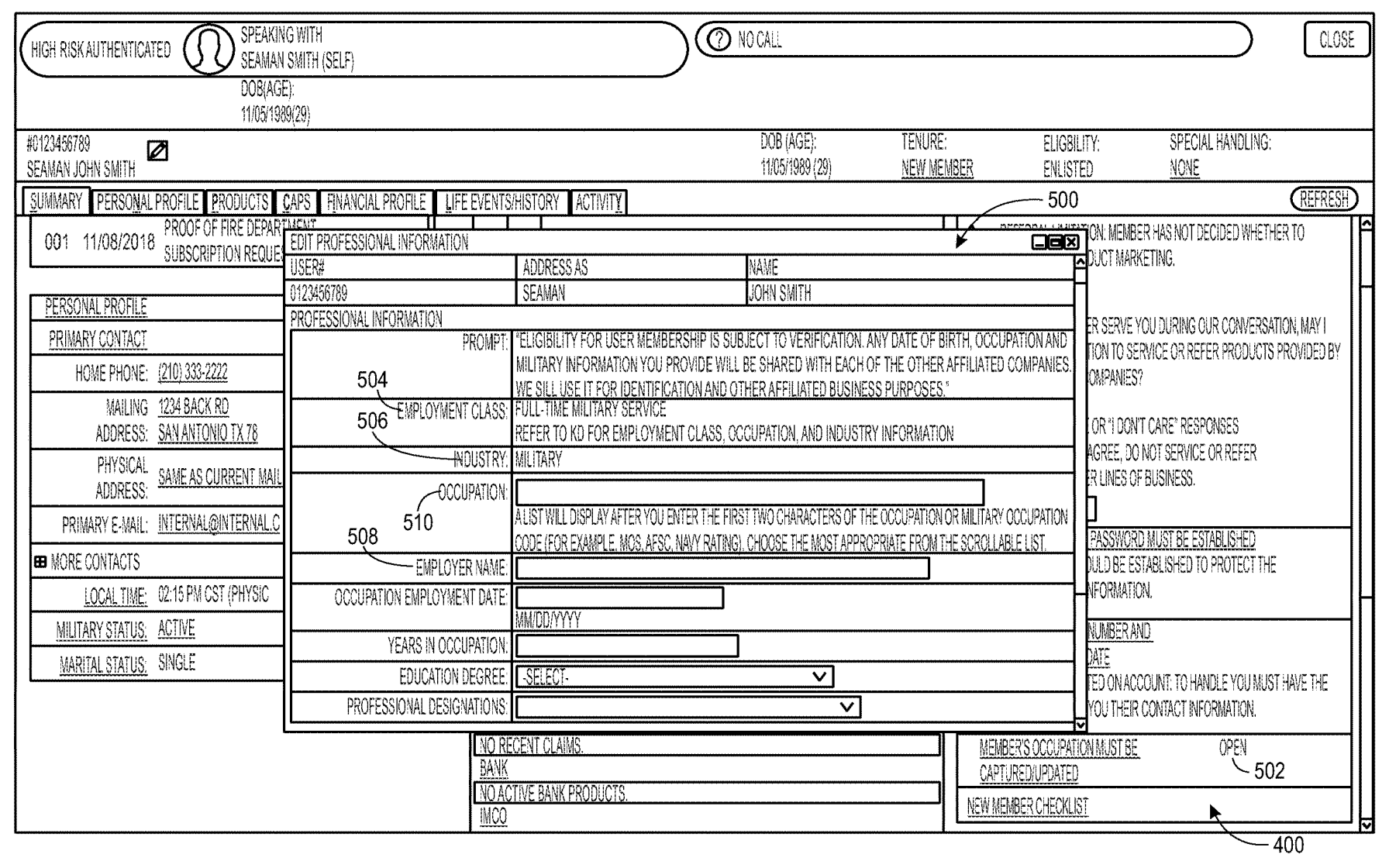
Figure 7:
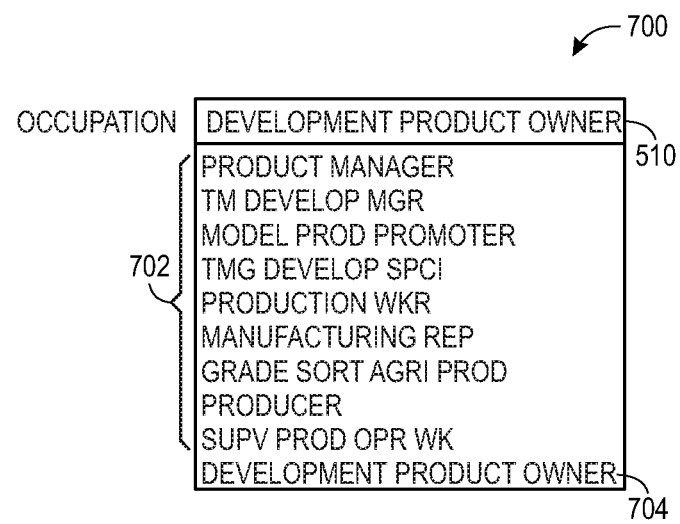

FIG. 4 is a schematic diagram, illustrating a graphical user interface for facilitating a call-center call, in accordance with an embodiment of the present disclosure; and FIG. 5 is a schematic diagram, illustrating a graphical user interface that prompts for call-center capture of occupation, in accordance with an embodiment of the present disclosure; and FIG. 6 is a schematic diagram, illustrating prescribed occupation match scoring, in accordance with an embodiment of the present disclosure; and FIG. 7 is a schematic diagram, illustrating an exemplary graphical user interface for providing occupation classifications, in accordance with an embodiment of the present disclosure.

DETAILED DESCRIPTION

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are generally directed toward dynamic classification of free-form occupational inputs to facilitate computer processing based upon pre-defined occupational classifications. As will be discussed in more detail below, computer processing may be greatly streamlined by classifying free-form entry of occupational data into one or more prescribed occupational classifications. Further, as classifications are made, machine-learning may be used to enable the computer itself to identify new classifications to be implemented and/or streamlined synonym matching for expedited classification.

Figure 1:
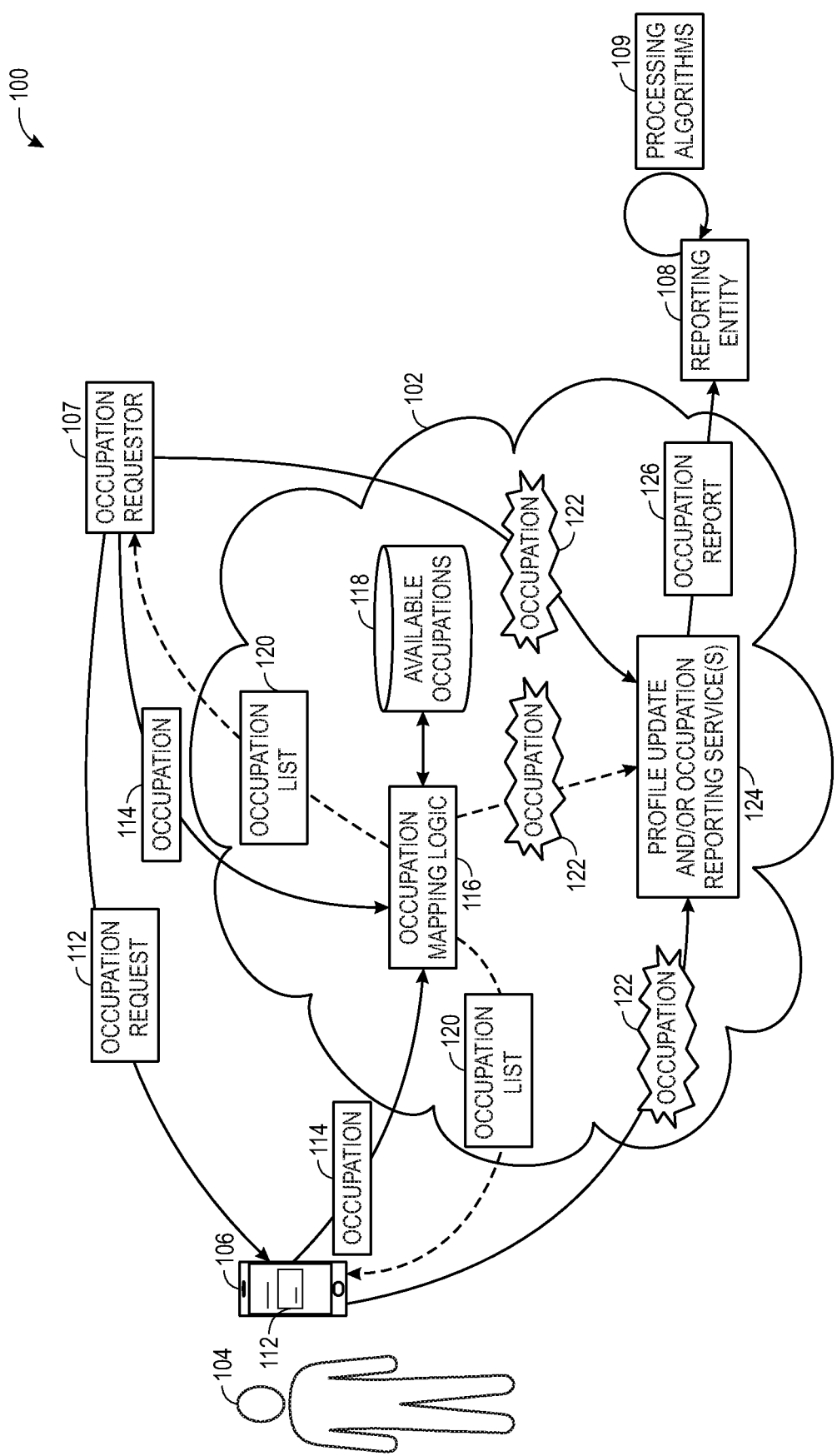
FIG. 1 is a schematic block diagram, illustrating a system for classifying occupations, in accordance with an embodiment of the present disclosure.

FIG. 1 is a schematic block diagram, illustrating a system 100 for classifying occupations, in accordance with an embodiment of the present disclosure. The system 100 includes an occupation processing cloud infrastructure 102 that facilitates classification of occupational inputs provided by a client user 104 (e.g., via input on a client computing device 106 or via reception by an occupation requestor 107 (e.g., a customer-service representative or automated telephony prompt via a telecommunications call) and provides an occupation classification to a reporting entity 108. The reporting entity 108 may use processing algorithms 109 (e.g., computer-implemented instructions (e.g., software) stored on a non-transitory, machine-readable medium) to process the received occupational classification. For example, anti-money laundering processing may flag risky occupations based upon the received occupational classifications. As may be appreciated, the processing algorithms 109 may become increasingly complex and/or bloated when having to account for numerous occupations. To counter-act software bloat, the processing algorithms 109 may expect the occupation classification to be one of a prescribed set of occupation classifications, reducing affordances for occupation classifications outside the prescribed set of occupation classifications. As may be appreciated, this may greatly impact the efficiency and simplicity of the processing algorithms 109.

However, one consideration for this software bloat mitigation technique is that the occupation classifications should be as accurate as possible. When free-form occupations are not mapped to a proper one of the prescribed set of occupation classifications, the processing algorithms 109 may improperly process the occupation.

Turning to details of the occupation collection, as mentioned above, the client electronic device 106 and/or an occupation requestor 107 (e.g., a call center operator) may provide an occupation request 112 to the user 104. For example, a graphical user interface may prompt the user 104 to provide a free-form occupation on the client device 106 and/or the occupation requestor 107 may request that the user 104 audibly provide their occupation. The user's specified reply of their occupation 114 is provided to the occupation processing cloud infrastructure 102 for occupation classification.

Occupation mapping logic 116 (e.g., machine-readable instructions, stored on a tangible, non-transitory, machine-readable medium, and executed by one or more processors of a machine) of the occupation processing cloud infrastructure 102 may perform an occupation mapping of the occupation 114 to one of a prescribed set of occupations 118 that are handled by the processing algorithms 109. The prescribed set of occupations 118 may be stored in a database accessible to the occupation mapping logic 116 and/or may be hard-coded in the occupation mapping logic 116. Further, in some embodiments, the reporting entity 108 (or other downstream processing component) may provide dynamic updates to the prescribed set of occupations 118, indicating updates to occupation classifications handled by the processing algorithms 109.

As will be described in more detail below, the occupation mapping logic 116 may use direct matching, synonym matching, and/or semantical matching to map the occupation 114 to one or more the prescribe set of occupations 118. In some instances, a dynamic occupation list 120 may be provided to the user 104 (e.g., via a graphical user interface displayed on the client device 106 and/or audibly provided by the occupation requestor 107.

In such an instance, the user 104 may select an applicable occupation from the occupation list 120. The selected occupation 122 is provided, via the client device 106 and/or the occupation requestor 107, to a profile updating and/or occupational reporting service 124, as the one of the prescribed set of occupation classifications.

The profile update and/or occupation reporting services 124 may then update an electronic profile of the user 104, by storing an association of the selected occupation 122 with the user 104 in a database. Further, an occupation report 126 may be provided to the reporting entity 108, for processing via the processing algorithms 109.

As may be appreciated, the occupational mapping of free-form occupation inputs to one of a prescribed set of occupations may provide significant benefit to computer processing. For one, development of the processing algorithms 109 may be less complex, reducing coding time significantly. Further, because processing algorithms 109 are less complex, the processing algorithms may be more efficient, both in processing time and in utilized storage space (e.g., via reduced software bloat).

Figure 2:
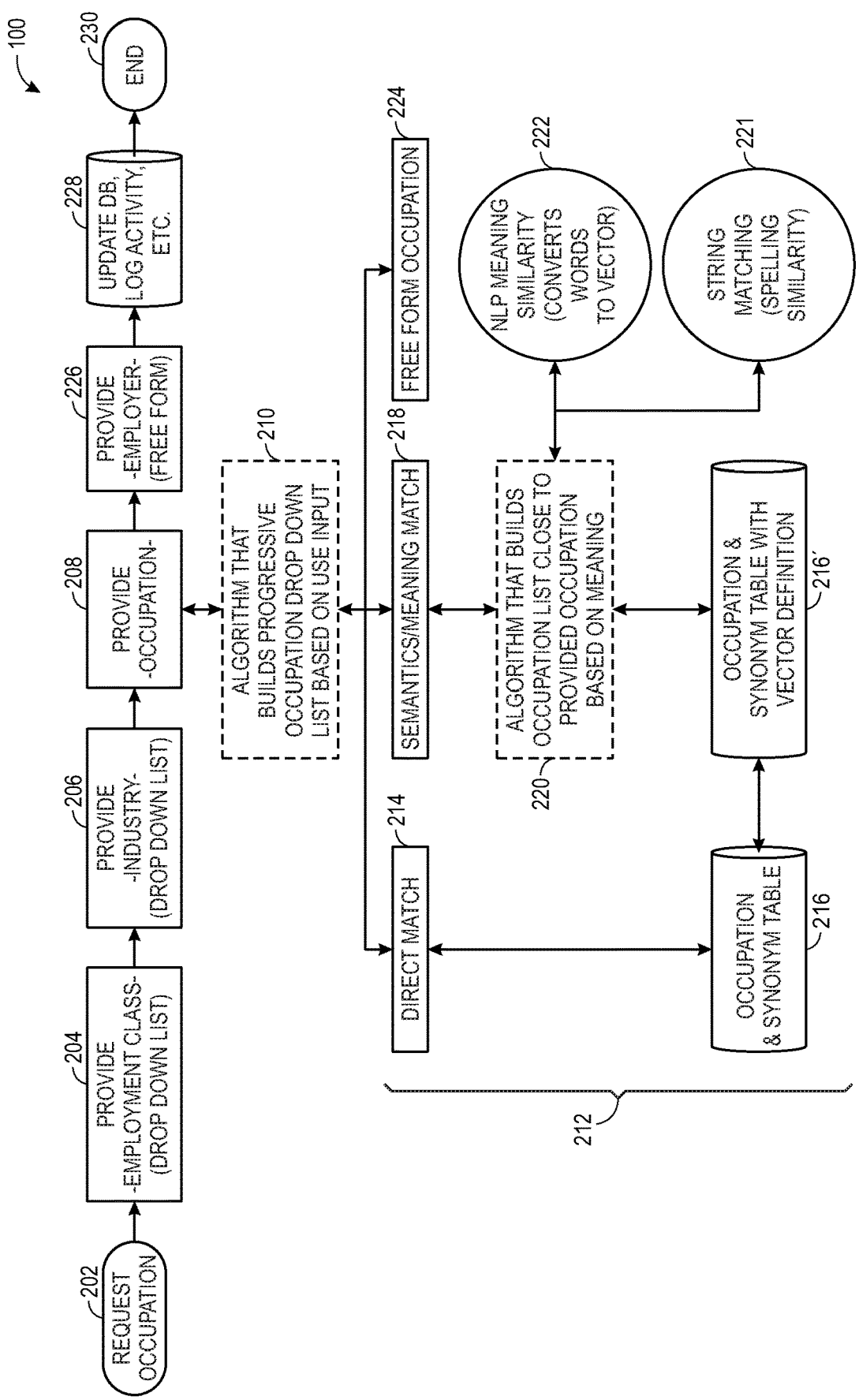
FIG. 2 is a flowchart, illustrating a process for classifying free-form occupation inputs, in accordance with an embodiment of the present disclosure.

Having discussed the broad details of the system 100 for classifying occupations, the discussion now turns to a more detailed discussion of mapping free-form occupation inputs to one or more of a prescribed set of occupation classifications. FIG. 2 is a flowchart, illustrating a process 200 for classifying free-form occupation inputs, in accordance with an embodiment of the present disclosure.

Process 200 begins with requesting the user provide an indication of an occupation (block 202). For example, as mentioned above, a prompt for occupation may be provided via a graphical user interface on a client electronic device and/or may be an audible prompt provided via a telephony call.

Further, in some instances, additional indicia associated with the occupation may be requested. For example, in the current embodiment, the user's employment class (e.g., public sector, private sector, full-time, part-time, etc.) may be collected (block 204). Further, in the current embodiment, the user's employment industry is also collected (block 206).

The user may provide their occupation via free-form input (block 208). For example, the user may provide such an indication via free-form text entry in a graphical user interface that prompts the user for their occupation. Alternatively, the user may provide their occupation via free-form audible input to an occupation requestor (e.g., an automated telephony prompt and/or a call center operator via a telephone call).

Next, an algorithm may be applied to the provided occupation to identify one or more occupations from a prescribed set of occupations (block 210). Blocks 212 provide detailed processes for this application. In some instances, the algorithm may include direct matching (block 214). The direct matching compares the provided occupation to the prescribed set of occupations to determine whether the provided occupation is explicitly contained in any of the prescribed set of occupations. For example, if the provided occupation is "analyst" and the prescribed set of occupations include "data analyst," "business analyst," and "doctor," a direct match will be found for both "data analyst" and "business analyst," as these occupations both include the provided occupation of "analyst."

As mentioned above, the prescribed set of occupations may be stored in an occupation table 216 of a database. In some instances, the occupation table 216 may include synonym associations. Synonym associations are words that directly correlate with an associated prescribed occupation. In some embodiments, codes, such as military occupation codes, may be stored as synonyms that are associated with particular prescribed occupations. When synonyms are associated with prescribed occupations, when the user provides the synonym and there is a direct match with the synonym, this can be considered a direct match with the associated prescribed occupation.

Another type of match that may be employed when mapping to prescribed occupations is a semantics/meaning match (block 218). The semantics/meaning match uses an algorithm that builds occupations that are close the provided occupation based upon meaning (block 220).

Approximate string matching techniques 221 may be used to find strings that match a pattern approximately, rather than exactly. In other words, the approximate string matching techniques 221 may be used to identify occupations with similar but not exactly similar spellings. This may help alleviate any misspellings and local-specific spellings of occupations.

The algorithm may further employ a Machine Learning Natural Language Processing (ML NLP) meaning similarity model 222 may be used to convert words to a vector of meaning. The ML NLP meaning similarity model 222 is a pre-trained deep learning model that may generate vectors based on a meaning similarity of a user input with prescribed occupations to find a closet match and/or set of closest matches. Training is performed on aggregated global word-to-word co-occurrence statistics from a corpus, where the resulting representations showcase interesting linear substructures of the word vector space. As a log-bilinear regression model for unsupervised learning of word representations, the ML NLP meaning similarity model 222 combines the features of two model families, namely the global matrix factorization and local context window methods.

A meaning vector is derived for the provided occupation, using the ML NLP meaning similarity model 222. Further, the occupation table 216 may be appended (table 216') to include a vector definition for each of the prescribed set of occupations. The vectors are once again determined using the Machine Learning Natural Language Processing (ML NLP) Meaning Similarity Model 222. The vector of the provided occupation and the vectors of the prescribed occupations are compared against one another to identify the prescribed occupation vectors that have the relatively closest affinity to the provided occupation vector. A subset of the prescribed set of occupations that meet threshold vector closeness requirements may be identified as semantical matches to the provided occupation.

As mentioned above, the matching to prescribed occupations may be used to generate a list of selectable prescribed occupations that a user may indicate as their occupation. A prescribed number of desired selections for the list of selectable prescribed occupations may be defined. For example, in some instances, a threshold of at least 10 occupation options may be desired to be presented to the user When there are not a sufficient number of prescribed occupations that either directly match or semantically match the provided occupation, a free form occupation (block 224) may be added as an option for selection in the prescribed occupation list. The results of the direct match, semantics match, and free-form occupation steps may be accumulated for entry in a prescribed occupation list. The user may select one of the occupations from the prescribed occupation list, resulting in a single prescribed occupation being provided as part of the occupation provision of block 208.

Once a prescribed occupation is selected, an employer or other characteristics associated with the prescribed occupation may be obtained (block 226). The indicia captured in blocks 204 and 206, the single prescribed occupation provided in block 208, and the employer and/or other characteristics provided in block 226 may be saved to the user's electronic profile and/or be provided for reporting (block 228), ending the process 200 (block 230).

Figure 3:
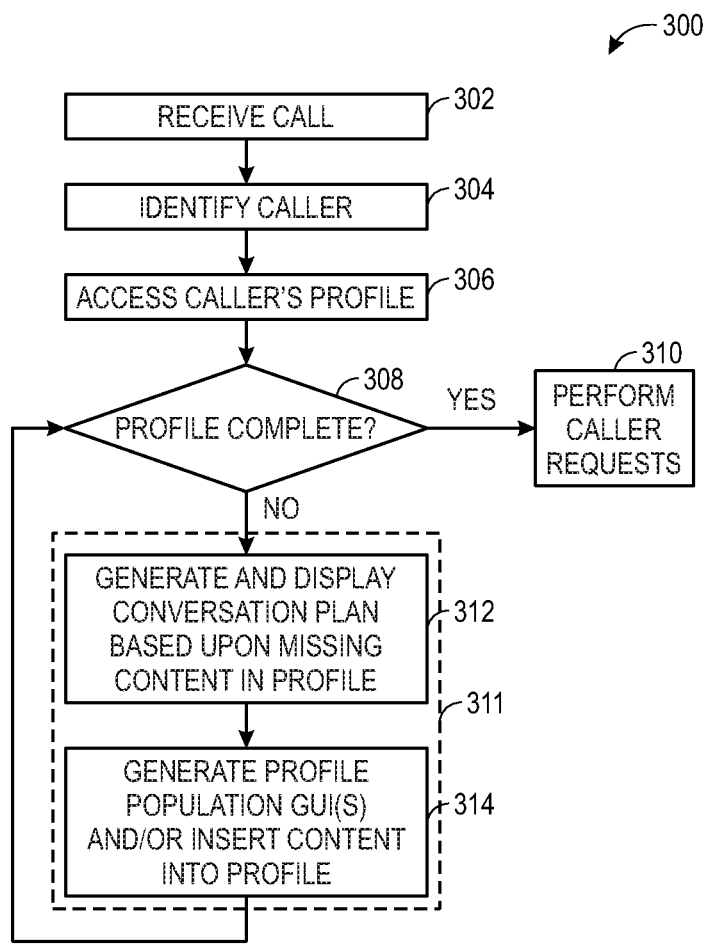
FIG. 3 is a flowchart, illustrating a process for obtaining and classifying an occupation via a call-center operation, in accordance with an embodiment of the present disclosure.

FIG. 3 is a flowchart, illustrating a process 300 for obtaining and classifying an occupation via a call-center operation, in accordance with an embodiment of the present disclosure. The process 300 begins by receiving a call (block 302), for example, at a call center. The caller is identified (block 304), via caller-id, voice-prompts, or other user identifying techniques.

Once the caller is identified, a processor may access the caller's electronic profile (block 306). This may be done, for example, by querying a database using an identifier associated with the caller as a key.

The processor may identify, via the query, whether the caller's profile is complete (decision block 308). In other words, the query may indicate whether required or desired information about the caller is present in the caller's digital profile. When a nil value or other default value is present in the caller's digital profile, the digital profile may be determined as incomplete.

If the caller's profile is complete, the processor may facilitate performance of the caller's request without prompting for additional digital profile information (block 310). However, when the caller's digital profile is not complete, the processor may implement a profile population procedure (block 311) and then subsequently determine whether the caller's profile is complete (decision block 308) after the profile population procedure (block 311) is complete.

The profile population procedure (block 111) begins by generating and displaying a conversation plan based upon the missing content in the digital profile (block 312). FIG. 4 is a schematic diagram, illustrating a conversation plan graphical user interface (GUI) 400 for facilitating a call-center call, in accordance with an embodiment of the present disclosure. As illustrated, the conversation plan GUI 400 provides various conversation points 402 for the call-center operator to make during the phone call. Here, conversation point 402A provides a question prompt 404 and response selections 406 (e.g., radio button selections, free-form text boxes, drop-down boxes, etc.) used to indicate the caller's response to the question prompt 404. While conversation point 402A relates to permission for sharing product marketing, question prompts 404 and response selections 406 may be provided for a number of different conversation points 402, including the missing occupation conversation point 402B relating to capturing missing occupation information for the caller. The conversation points 402 may be discussed in order from top to bottom of the conversation plan GUI 400 or may be discussed in other orders selected by the call center operator. To access question prompts 404 associated with a particular conversation point 402, the call center operator may select conversation point in the conversation plan GUI 400.

Returning to FIG. 3, the profile population procedure (block 311) continues by generating a profile population GUI, such that missing content may be inserted into the caller's profile (block 314). FIG. 5 is a schematic diagram, illustrating a profile population graphical user interface (GUI) 500 that prompts for call-center capture of occupation, in accordance with an embodiment of the present disclosure. As illustrated in FIG. 5, the profile population GUI 500 may pop-up over the conversation plan GUI 400 upon selection of a particular conversation point 402 (e.g., here the missing occupation conversation point 402B). Further, an "open" status indication 502 may be indicated on the missing occupation conversation point 402B of the conversation plan GUI 400, indicating that this is the current conversation point 402 that is being discussed.

The profile population GUI 500 includes data entry fields related to the current conversation point 402 (e.g., here, the missing occupation conversation point 402B). For example, the Employment class field 504 allows the call center operator to enter the employment class of block 204 of FIG. 2. Further, the Industry field 506 allows the call center operator to enter the industry of block 206 of FIG. 2. The Employer Name field 508 allows the call center operator to enter the employer of block 226 of FIG. 2. The Occupation field 510 allows the call center operator to enter free-form text indicating the user's provided occupation that triggers block 210 of FIG. 2.

FIGS. 6 and 7 illustrate population of a drop-down selectable prescribed occupation list based upon free-form text provided in Occupation field 510. Specifically, FIG. 6 is a schematic diagram, illustrating prescribed occupation match scoring 600, in accordance with an embodiment of the present disclosure and FIG. 7 is a schematic diagram, illustrating an exemplary selectable prescribed occupation list for providing prescribed occupation classifications, in accordance with an embodiment of the present disclosure.

Starting first with FIG. 6, the scoring 600 illustrates various affinities between prescribed occupations 602 and the free-form text entered into Occupation field 510. The prescribed occupation names are listed in the CustomerOccupationNm column 606 and a description of the prescribed occupations are provided in the CustomerOccupationDescription column 608. The spelling column 610 provides a score based upon whether terms in the free-form text 604 match text in the prescribed occupation names or descriptions. The closer the match, the higher the score in the spelling column 610. For example, the term "product" is found in both the free-form text 604 and the occupation name "product manager." Thus, the product manager prescribed occupation is attributed a direct match score of 200. Had the entire free-for text 604 been found in the prescribed occupation name, the direct match score would be higher. Conversely, the prescribed occupation "marketing manager" does not include any of the free-form text 604. Accordingly, the spelling score 610 for this the prescribed occupation is attributed a score of 0. The prescribed occupation description can also be used to match against the free-form text 604 in the matching scoring.

The meaning scoring 612, as discussed above is obtained by comparing meaning vectors of the free-form text 604 against the meaning vectors of the prescribed occupations 602. The meaning scoring 612 increases as the affinity between the compared vectors increases. For example, the vector associated with the "product manager" prescribed occupation has a relatively higher affinity to the "development product owner" vector than the vector associated with the "tmg develop mgr" prescribed occupation, as indicated by the relatively higher meaning scoring of 338.280489 versus 303.165085.

In some embodiments, a composite scoring 614 may indicate a particular rank of predicted match to the free-form text 604. In the current embodiment, the composite score is simply the addition of the spelling scoring 610 and the meaning scoring 612. In some embodiments, one of the scores may be prioritized as indicative of a match. For example, a direct match may be prioritized over a semantic match. Thus, in some embodiments, the spelling scoring 610 may be used as a primary priority indicator and the meaning scoring 612 may be used as a secondary indicator. In some embodiments, this may be implemented by first selecting prescribed occupations that have a spelling scoring 610 that meets a threshold spelling scoring 610 and then selecting any additional prescribed options that are needed based upon prescribed occupations that have a meeting scoring 612 that exceeds a meaning scoring 612 threshold.

However, a composite score may provide a more well-rounded set of overall options in some embodiments. Accordingly, to prioritize one set of scores (e.g., the spelling scoring 610) over another set of scores (e.g., the meaning scoring 612), a priority weighting may be added to the spelling scoring 610, thereby providing a higher impact to the composite score 614.

A number of criteria may be used to select prescribed occupations for presentation to the user. For example, in some embodiments, composite score thresholds may indicate suitable prescribed occupations that may be presented to the user (or the call center operator). In the current embodiment, for example, the composite score threshold may be 315, meaning that any prescribed options above 315 are suitable for presentation to the user and/or the call center operator. Accordingly, as illustrated in the prescribed occupation drop-down list 700, the top nine prescribed occupations, which each have a composite score 614 over 315 are provided in the prescribed occupation drop-down list 700.

As previously mentioned, when there are not enough suitable options (e.g., as dictated by a pre-defined threshold number of list items specified in machine-readable instructions), an additional option 704 representing the free-form text 604 may be added to this list 700. Here, the additional option 704 has been added because the pre-defined threshold number of list items was 10 and there were only 9 suitable prescribed occupation items to be added to the list 700 (e.g., due to the other prescribed occupations not meeting the suitability criteria (e.g., having composite scoring over 315)).

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A tangible, non-transitory, machine-readable medium, comprising machine-readable instructions that, when executed by one or more processors of a machine, cause the machine to:
   identify a caller of a call;
   access an electronic profile of the caller;
   determine that the electronic profile does not include an occupation indication; and
   generate a conversation plan for the call, prompting for a free-form indication of an occupation;
   receive the free-form indication of the occupation;
   generate a meaning vector of the free-form indication;
   compare the meaning vector of the free-form indication against meaning vectors associated with a prescribed set of occupations;
   determine meaning scores for the prescribed set of occupations based upon an affinity between vector of the free-form indication and the vectors associated with the prescribed set of occupations;
   select a subset of the prescribed set of occupations based at least in part upon the meaning scores for the prescribed set of occupations;
   present a selectable list of prescribed occupations, the selectable list comprising the subset;
   receive an indication of a selection a particular prescribed occupation for the selectable list; and
   provide the particular prescribed occupation to a reduced software bloat downstream-processing system that is configured to only handle occupations in prescribed set of occupations.

2. The tangible, non-transitory, machine-readable medium of claim 1, comprising machine-readable instructions that, when executed by the one or more processors of the machine, cause the machine to:
   generate the meaning vector of the free-form indication by applying the free-form indication to a Machine Learning Natural Language Processing (ML NLP) Meaning Similarity Model.

3. The tangible, non-transitory, machine-readable medium of claim 1, comprising machine-readable instructions that, when executed by the one or more processors of the machine, cause the machine to:
   generate the meaning vectors associated with a prescribed set of occupations by applying the prescribed set of occupations to a Machine Learning Natural Language Processing (ML NLP) Meaning Similarity Model.

4. The tangible, non-transitory, machine-readable medium of claim 1, comprising machine-readable instructions that, when executed by the one or more processors of the machine, cause the machine to:
   identify a threshold number of items to be presented in the selectable list of prescribed occupations; and
   select the subset of the prescribed set of occupations based at least in part upon the threshold number of items to be presented in the selectable list of prescribed occupations.

5. The tangible, non-transitory, machine-readable medium of claim 1, comprising machine-readable instructions that, when executed by the one or more processors of the machine, cause the machine to:
   present the selectable list of prescribed occupations on a customer service representative graphical user interface.

6. The tangible, non-transitory, machine-readable medium of claim 1, comprising machine-readable instructions that, when executed by the one or more processors of the machine, cause the machine to:
present the selectable list of prescribed occupations via an automated telephony prompt.

7. A computer-implemented method, comprising:
identifying a caller of a call;
accessing an electronic profile of the caller;
determining that the electronic profile does not include an occupation indication; and
generating a conversation plan for the call, prompting for a free-form indication of an occupation;
receiving the free-form indication of the occupation;
generating a meaning vector of the free-form indication;
comparing the meaning vector of the free-form indication against meaning vectors associated with a prescribed set of occupations;
determining meaning scores for the prescribed set of occupations based upon an affinity between vector of the free-form indication and the vectors associated with the prescribed set of occupations;
selecting a subset of the prescribed set of occupations based at least in part upon the meaning scores for the prescribed set of occupations;
presenting a selectable list of prescribed occupations, the selectable list comprising the subset;
receiving an indication of a selection a particular prescribed occupation for the selectable list; and
providing the particular prescribed occupation to a reduced software bloat downstream-processing system that is configured to only handle occupations in prescribed set of occupations.

8. The computer-implemented method of claim 7, comprising:
generating the meaning vector of the free-form indication by applying the free-form indication to a Machine Learning Natural Language Processing (ML NLP) Meaning Similarity Model.

9. The computer-implemented method of claim 7, comprising:
generating the meaning vectors associated with a prescribed set of occupations by applying the prescribed set of occupations to Machine Learning Natural Language Processing (ML NLP) Meaning Similarity Model.

10. The computer-implemented method of claim 7, comprising:
identifying a threshold number of items to be presented in the selectable list of prescribed occupations; and
selecting the subset of the prescribed set of occupations based at least in part upon the threshold number of items to be presented in the selectable list of prescribed occupations.

11. The computer-implemented method of claim 7, comprising:
presenting the selectable list of prescribed occupations on a customer service representative graphical user interface.

12. The computer-implemented method of claim 7, comprising:
presenting the selectable list of prescribed occupations via an automated telephony prompt.

13. A system, comprising:
a client system, configured to:
provide a graphical user interface enabling a user to provide a free-form indication of an occupation;
occupation mapping logic, configured to:
receive the free-form indication of the occupation from the client system;
generate a meaning vector of the free-form indication;
compare the meaning vector of the free-form indication against meaning vectors associated with a prescribed set of occupations;
determine meaning scores for the prescribed set of occupations based upon an affinity between vector of the free-form indication and the vectors associated with the prescribed set of occupations;
select a subset of the prescribed set of occupations based at least in part upon the meaning scores for the prescribed set of occupations; and
provide a list of prescribed occupations, the list of prescribed occupations comprising the subset;
wherein the client system is further configured to:
receive an indication of a selection a particular prescribed occupation from the list;
a reduced software bloat downstream-processing system configured to receive, from the client system, the indication of the selection of the particular prescribed occupation from the list, wherein the reduced software bloat downstream-processing system is configured to only handle occupations in prescribed set of occupations;
a telephony system, configured to:
identify a caller of a call;
access an electronic profile of the caller;
determine that the electronic profile does not include an occupation indication; and
a customer service representative system, configured to:
in response to the telephony system determining that the electronic profile does not include the occupation indication, generate a conversation plan for the call, prompting for the free-form indication of the occupation.

14. The system of claim 13, wherein the occupation mapping logic is configured to:
generate the meaning vector of the free-form indication by applying the free-form indication to a Machine Learning Natural Language Processing (ML NLP) Meaning Similarity Model;
generate the meaning vectors associated with a prescribed set of occupations by applying the prescribed set of occupations to Machine Learning Natural Language Processing (ML NLP) Meaning Similarity Model; or both.

15. The system of claim 13, wherein the occupation mapping logic is configured to:
identify a threshold number of items to be presented in the list of prescribed occupations; and
select the subset of the prescribed set of occupations based at least in part upon the threshold number of items to be presented in the list of prescribed occupations.

16. The system of claim 13, wherein:
the telephony system is configured to present the list of prescribed occupations via an automated telephony prompt.

17. The system of claim 13, wherein:
the client system is configured to present the list of prescribed occupations on a customer service representative graphical user interface.

* * * * *

UNITED STATES PATENT AND TRADEMARK OFFICE
CERTIFICATE OF CORRECTION

| | |
|---|---|
| PATENT NO. | : 11,330,106 B1 |
| APPLICATION NO. | : 17/036935 |
| DATED | : May 10, 2022 |
| INVENTOR(S) | : Thyagarajan |

It is certified that error appears in the above-identified patent and that said Letters Patent is hereby corrected as shown below:

On the Title Page

Item (57), under "ABSTRACT", in Column 2, Line 12, delete "selection a particular" and insert -- selection of a particular --, therefor.

In the Drawings

In Fig. 2, Sheet 2 of 7, delete Tag "100" and insert Tag -- 200 --, therefor.

In the Specification

In Column 1, Line 28, delete "DRAWINGS" and insert -- BRIEF DESCRIPTION OF THE DRAWINGS --, therefor.

In Column 1, Line 46, delete "disclosure; and" and insert -- disclosure; --, therefor.

In Column 1, Lines 49-50, delete "disclosure; and" and insert -- disclosure; --, therefor.

In Column 4, Line 30, delete "close the" and insert -- close to the --, therefor.

In Column 6, Line 55, delete "spelling column 610" and insert -- spelling scoring 610 --, therefor.

In Column 6, Line 59, delete "spelling column 610" and insert -- spelling scoring 610 --, therefor.

In Column 6, Line 63, delete "free-for text 604" and insert -- free-form text 604 --, therefor.

In Column 6, Line 67, delete "this the" and insert -- the --, therefor.

Signed and Sealed this
Second Day of August, 2022

Katherine Kelly Vidal
*Director of the United States Patent and Trademark Office*

In the Claims

In Column 8, Line 9, in Claim 1, delete "indication; and" and insert -- indication; --, therefor.

In Column 8, Line 27, in Claim 1, delete "selection a" and insert -- selection of a --, therefor.